(12) United States Patent
Utsumi

(10) Patent No.: US 8,749,808 B2
(45) Date of Patent: Jun. 10, 2014

(54) PRINTING APPARATUS AND METHOD OF CONTROLLING SAME

(75) Inventor: Yuichi Utsumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 87 days.

(21) Appl. No.: 13/603,189

(22) Filed: Sep. 4, 2012

(65) Prior Publication Data

US 2013/0070281 A1 Mar. 21, 2013

(30) Foreign Application Priority Data

Sep. 20, 2011 (JP) ................................. 2011-205233

(51) Int. Cl.
*G06F 15/00* (2006.01)
*G06F 3/12* (2006.01)
*G06K 15/00* (2006.01)
*G06K 1/00* (2006.01)

(52) U.S. Cl.
CPC .............. *G06K 15/00* (2013.01); *G06F 3/1238* (2013.01); *G06F 3/1274* (2013.01)
USPC ......................................... 358/1.14; 358/1.15

(58) Field of Classification Search
CPC ...... G06K 15/00; G06F 3/1238; G06F 3/1274
See application file for complete search history.

(56) References Cited

U.S. PATENT DOCUMENTS

| 6,932,523 | B1 | 8/2005 | Yamada et al. | |
| 7,340,514 | B2 * | 3/2008 | Yamada et al. | 709/223 |
| 2004/0156070 | A1 * | 8/2004 | Gassho | 358/1.14 |

FOREIGN PATENT DOCUMENTS

| JP | 2001-075748 A | 3/2001 |
| JP | 2007-179140 A | 7/2007 |

* cited by examiner

*Primary Examiner* — Douglas Tran
(74) *Attorney, Agent, or Firm* — Fitzpatrick, Cella, Harper & Scinto

(57) ABSTRACT

It is determined whether a password for a secure print function has been appended to print data, which is to be reprinted, that has been stored in a memory for storing this print data received from a host computer. A prescribed period of time up to the moment of data deletion regarding the print data for which it has been determined that the secure print password has been appended thereto is set to be different from a prescribed period of time up to the moment of data deletion regarding the print data for which it has been determined that the secure print password has not been appended thereto.

7 Claims, 15 Drawing Sheets

| No. | JOB ID | JOB OWNER | FILE NAME | DATA SIZE | REGISTRATION DATE | SECURE |
|---|---|---|---|---|---|---|
| 1 | id0001 | user1101 | REPORT 0001 | 300KB | 2011/01/01 15:21 | 0 |
| 2 | id0002 | user1201 | Presentation_05 | 950KB | 2011/02/03 17:33 | 0 |
| 3 | id0003 | user1505 | Financial_data | 45KB | 2011/02/14 11:05 | 1 |
| ⋮ | ⋮ | ⋮ | ⋮ | ⋮ | ⋮ | ⋮ |

| No. | JOB ID | JOB OWNER | FILE NAME | DATA SIZE | REGISTRATION DATE | SECURE | REPRINT PASSWORD |
|---|---|---|---|---|---|---|---|
| 1 | id0001 | user1101 | REPORT 0001 | 300KB | 2011/01/01 15:21 | 0 | 0 |
| 2 | id0002 | user1201 | Presentation_05 | 950KB | 2011/02/03 17:33 | 0 | 0 |
| 3 | id0003 | user1505 | Financial_data | 45KB | 2011/02/14 11:05 | 0 | 1 |
| ...... | ...... | ...... | ...... | ...... | ...... | ...... | ...... |

1501, 1502

PRINTING APPARATUS AND METHOD OF CONTROLLING SAME

BACKGROUND OF THE INVENTION

1. Field of the Invention

The present invention relates to a printing apparatus capable of reprinting print data, which has already been printed once, in accordance with a reprint instruction, and method of controlling the printing apparatus.

2. Description of the Related Art

After printing has been performed based upon print data received from a data processing apparatus such as a host computer, a user may wish to request that one more copy of the same data be printed. There is a reprinting technique (for example, see Japanese Patent Laid-Open No. 2001-75748) in which, in response to this request, print data is printed in accordance with a reprint instruction, which is issued by operating an operation panel on the printing apparatus, without resending the print data from the host computer.

With ordinary print processing, a printing apparatus stores a print job, which has been received from a host computer, in a secondary storage device possessed by the printing apparatus and, following the end of print processing, deletes the print job stored in the secondary storage device. On the other hand, with a printing apparatus capable of reprinting, the print job stored in the secondary storage device is not deleted but is left in the storage device even after print processing ends. As a result, by entering a reprint instruction from an operation panel on the printing apparatus, the user can reprint an image, which has already been printed once, without the print data being received from the host computer again.

With the conventional reprinting technique described above, an unspecified number of users can execute reprint by operating the operation panel on the printing apparatus. That is, it is possible for anyone to reprint another person's document without the permission of this person. This represents an extreme lack of confidentiality. As an example of a technique for solving this problem, Japanese Patent Laid-Open No. 2007-179140 proposes deleting a print job, which has been stored in a storage device of an image forming apparatus, if prescribed conditions are satisfied. For instance, in one example of a proposal, if a prescribed period of time elapses after a print job has been stored in the storage device, then the print job is deleted.

However, in a case where a print job is deleted upon elapse of a prescribed period of time, as with the technique proposed in Japanese Patent Laid-Open No. 2007-179140, a user who wishes to print the print job is inconvenienced if the prescribed period of time has been set to be too short. On the other hand, although convenience is enhanced if the prescribed period of time is set to be long, a problem which arises is sacrificed confidentiality with regard to a print-job document that has been stored in the printing apparatus.

SUMMARY OF THE INVENTION

An aspect of the present invention is to solve the above-mentioned problems with the conventional technology.

A feature of the present invention is to provide a printing apparatus, as well as a method of controlling the same, which, while diminishing the security risk of a reprint function, does not sacrifice the convenience of the user who utilizes the reprint function.

According to an aspect of the present invention, there is provided a printing apparatus for executing print processing based upon print data, comprising: a storage unit configured to store print data, which is to be reprinted, received from a host computer; a determination unit configured to determine whether a password for secure print has been appended to the print data, which is to be reprinted, stored in the storage unit; a print control unit configured to print the print data in accordance with an input of the password for secure print from a user in a case where it is determined by the determination unit that the password for secure print has been appended to the print data; a deletion unit configured to delete the print data, which is to be reprinted, stored in the storage unit, upon elapse of a prescribed period of time following storage of the print data, which is to be reprinted, in the storage unit; and a control unit configured to exercise control so as to set, to periods of time that differ from each other, the prescribed period of time regarding the print data determined by the determination unit to have the password for secure print appended thereto and the prescribed period of time regarding the print data determined by the determination unit to not have the password for secure print appended thereto.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a diagram for describing a stored-job management table according to this embodiment;

FIG. 15 is a diagram illustrating an example of a stored-job management table according to the second embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
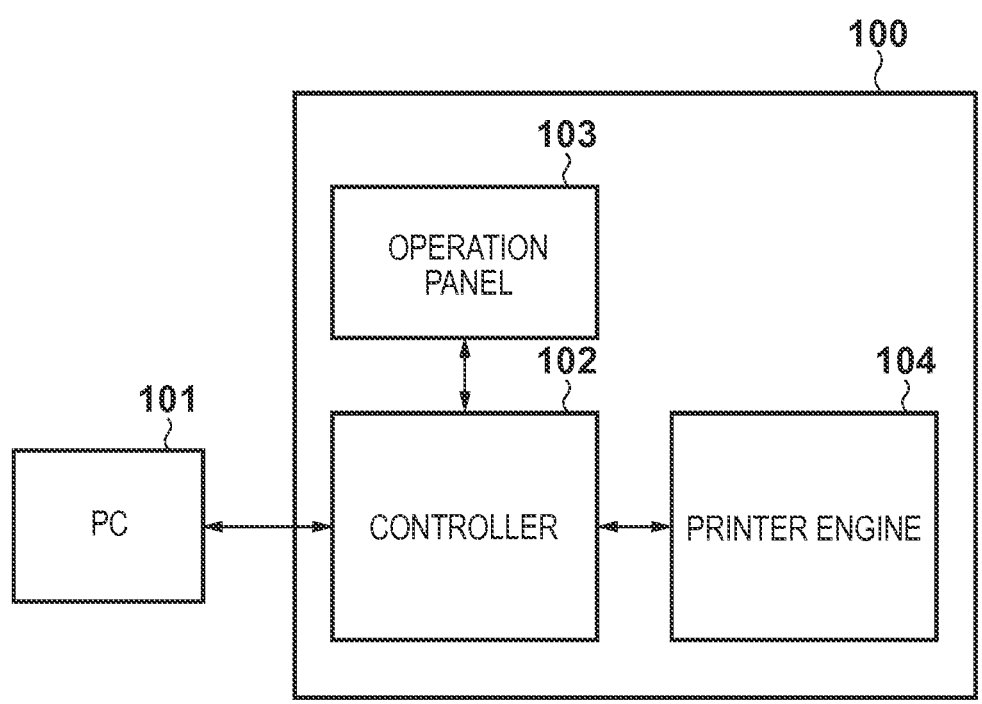
FIG. 1 is a block diagram illustrating the configuration of a printing system that includes an image forming apparatus (printing apparatus) according to an embodiment of the present invention.

FIG. 1 is a block diagram illustrating the configuration of a printing system that includes an image forming apparatus 100 (printing apparatus) according to a first embodiment of the present invention.

The image forming apparatus 100 has a controller 102, an operation panel 103 and a printer engine 104. A personal computer 101 functions as a host computer that transmits print jobs to the image forming apparatus 100. The personal computer 101 transmits print data and attribute information of the print job, etc., to the image forming apparatus 100 as the print job.

Figure 2:
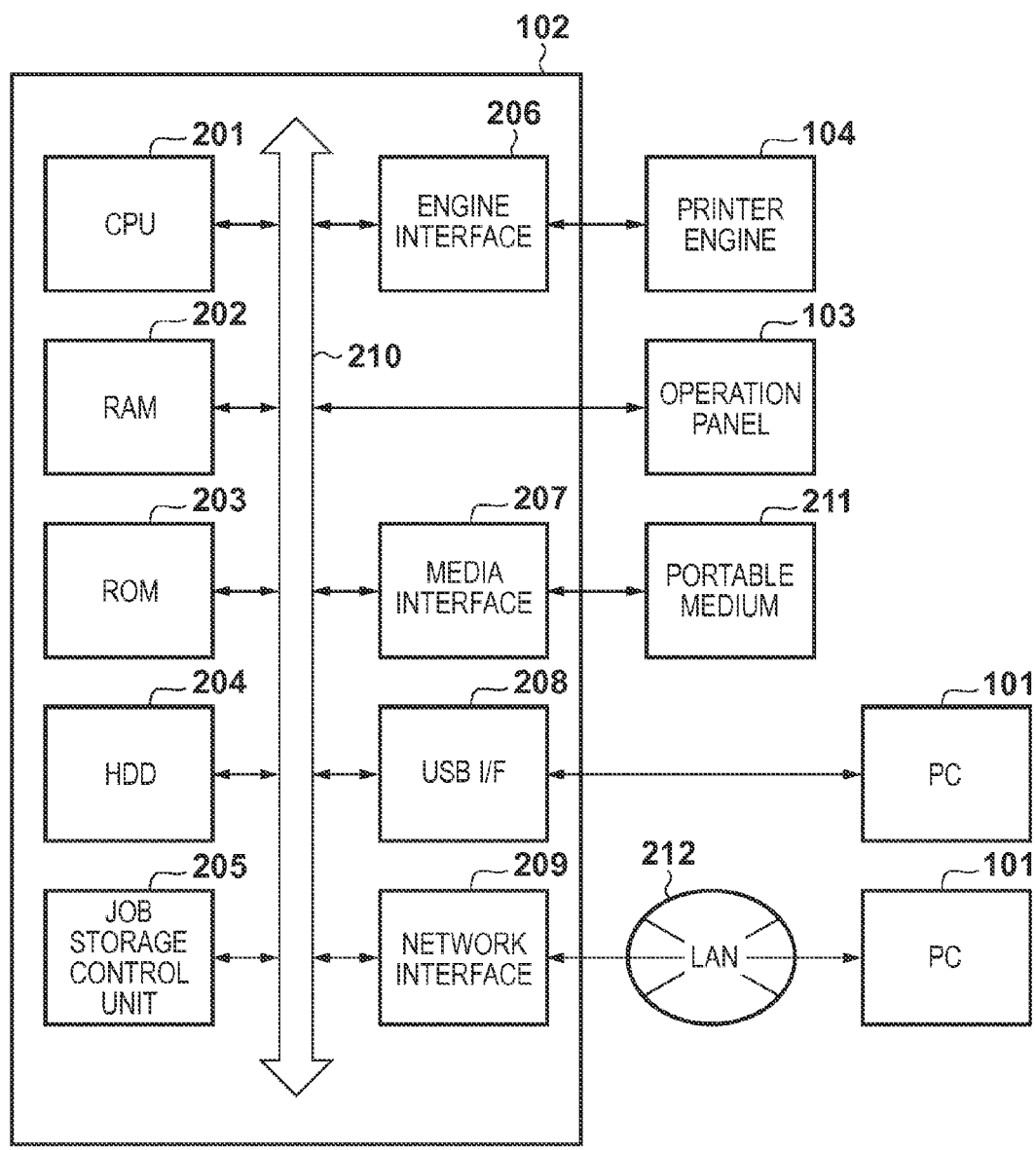
FIG. 2 is a block diagram for describing the configuration of a controller in the image forming apparatus according to the embodiment.

FIG. 2 is a block diagram for describing the configuration of the controller 102 in the image forming apparatus 100 according to the first embodiment.

The controller 102 includes a CPU 201, a RAM 202, ROM 203 and a hard-disk drive (HDD) 204 that functions as a secondary storage device. The controller 102 further includes a job storage control unit 205 that controls processing for storing print data, which is transmitted from the personal computer 101, on the hard-disk drive 204 of the image forming apparatus 100. The job storage control unit 205 takes charge of processing such as for storing and deleting a print job that has been stored in the RAM 202 or on the hard-disk drive 204 for the purpose of reprinting. Since this processing is executed periodically, the job storage control unit 205 includes a timekeeping RTC (Real-Time Clock) or a function equivalent thereto (not shown). The controller 102 further includes an engine interface 206, a media interface 207, a USB interface 208 and a network interface 209. Each of these units is connected to the CPU 201 via a system bus 210.

The engine interface 206 controls interfacing between the printer engine 104 and the CPU 201. The system bus 210 is for connecting to the operation panel 103 as well. The personal computer 101, which transmits a print job to the image forming apparatus 100, is connected to the USB interface 208 or network interface 209 of the controller 102 via a USB or a network such as a local-area network (LAN) 212. Further, a portable medium 211 such as a USB memory or various media cards (an SD card, for example) is connected to the media interface 207. Image data, device setting information and an updating program, etc., may be stored on the portable medium 211.

The CPU 201 executes overall control of each of the blocks in accordance with various control programs that have been stored in the ROM 203. Specifically, these control programs may be programs which, after being compressed and stored in a program area of the ROM 203, are expanded in the RAM 202 and then executed. Alternatively, the control programs may be stored on the hard-disk drive 204 in the compressed or non-compressed state. The network interface 209 executes processing for communicating with the personal computer 101 via the LAN 212 or the like. The USB interface 208 also executes processing for communicating with the personal computer 101 in similar fashion. The CPU 201 applies the necessary image processing to data contained in a print job received from the personal computer 101 via the USB interface 208 or network interface 209. The data that has been subjected to this image processing is stored temporarily in the RAM 202 or on the hard-disk drive 204 and is output to the engine interface 206 as an image signal for sequential printing.

The job storage control unit 205 manages storage and deletion, etc., of print data and attribute information received from the personal computer 101 in response to an instruction from the CPU 201. The job storage control unit 205 is one of the important components in terms of implementing the printing function.

Next, print processing that includes a reprint mode will be described with reference to the flowcharts of FIGS. 3 to 9. As already described, the processing shown in the flowcharts of FIGS. 3 to 9 is controlled and executed by the CPU 201 in accordance with the control programs stored in the ROM 203 or on the hard-disk drive 204.

Figure 3:
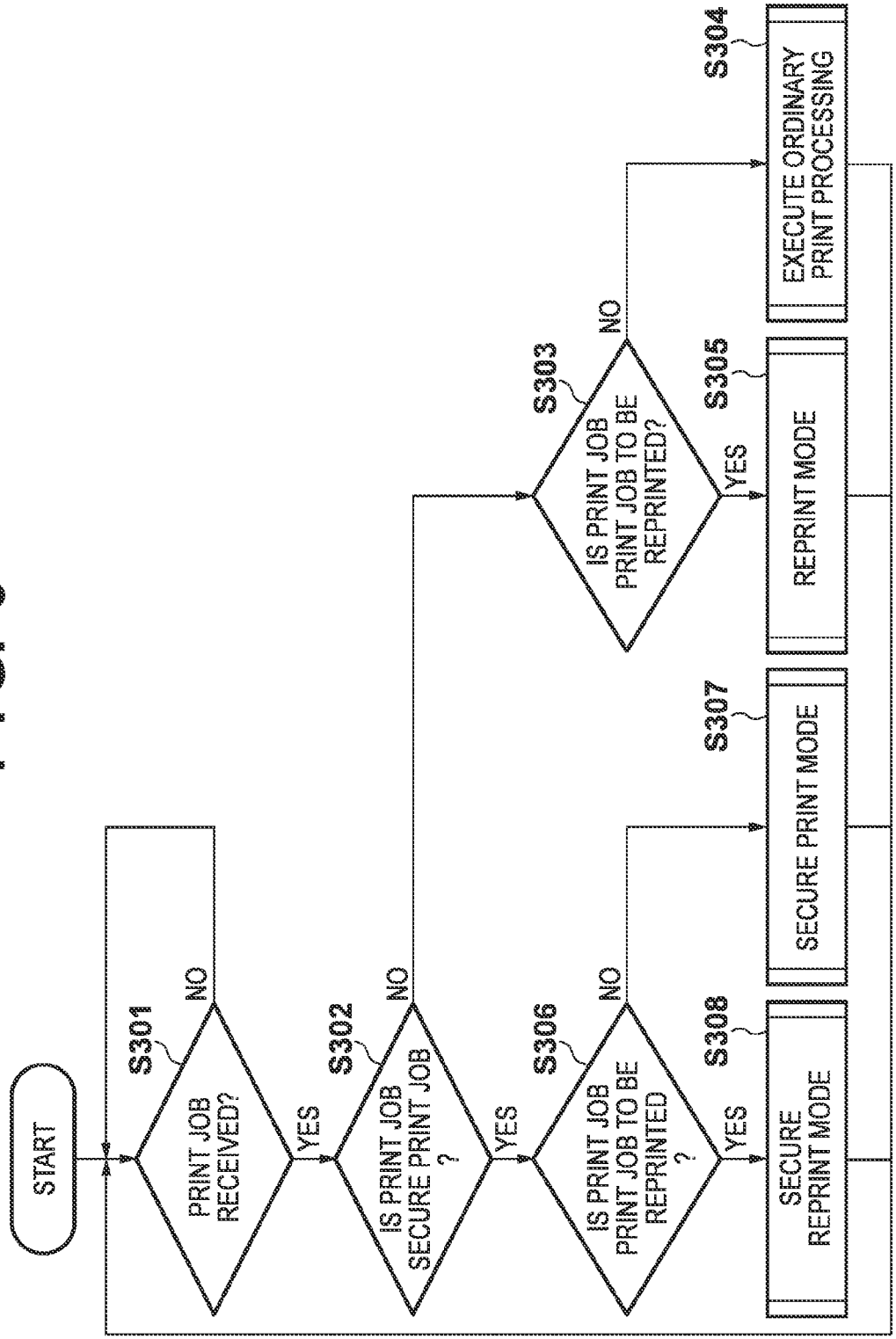
FIG. 3 is a flowchart for describing processing by which the image forming apparatus of the embodiment determines the attributes of a print job received from a personal computer and decides the print mode.

FIG. 3 is a flowchart for describing processing by which the image forming apparatus 100 of the first embodiment determines the attributes of a print job received from the personal computer 101 and decides the print mode.

First, in step S301, the CPU 201 determines whether a print job has been received from the personal computer 101 via the USB interface 208 or network interface 209. If it is determined that a print job has been received, then control proceeds to step S302. Here the CPU 201 determines, based upon the attribute information of the received print job, whether the print job is print job for secure printing. It should be noted that the attribute information of the print job is transmitted along with the print data to the image forming apparatus 100 by a printer driver (not shown) that runs on the personal computer 101. The printer driver sets the attribute information of the print job in accordance with contents specified by the user. (The processing flow of the printer driver is not shown.)

The secure print function is such that when a print job is to be executed, a password is set in advance by the printer driver and the print job is executed only after the set password is input by the user using the operation panel 103 on the image forming apparatus 100. Since print processing is started as a result of the user inputting a password, this function is one that is useful in a case where a highly confidential document or the like is to be printed.

If it is determined in step S302 that the print job is not a secure print job, then, in step S303, the CPU 201 determines whether the print job is a job that utilizes the reprint mode. If the print job is not one that is the object of reprinting, control proceeds to step S304 and the CPU 201 executes ordinary print processing. On the other hand, if the print job is one that is the object of reprinting, control proceeds to step S305 and the CPU 201 executes print processing in the reprint mode. The details of the processing executed in steps S304 and S305 will be described later with reference to the flowcharts of FIGS. 4 and 5.

If it is determined in step S302 that the print job is a secure print job, control proceeds to step S306 and the CPU 201 determines whether this is a reprint print job utilizing reprinting. If this job is not a reprint print job, then control proceeds to processing in a secure print mode in step S307. If the job is a reprint print job, then control proceeds to processing in a secure reprint mode step S308. The details of the processing executed in steps S307 and S308 will be described later with reference to the flowcharts of FIGS. 6 and 7.

Figure 4:
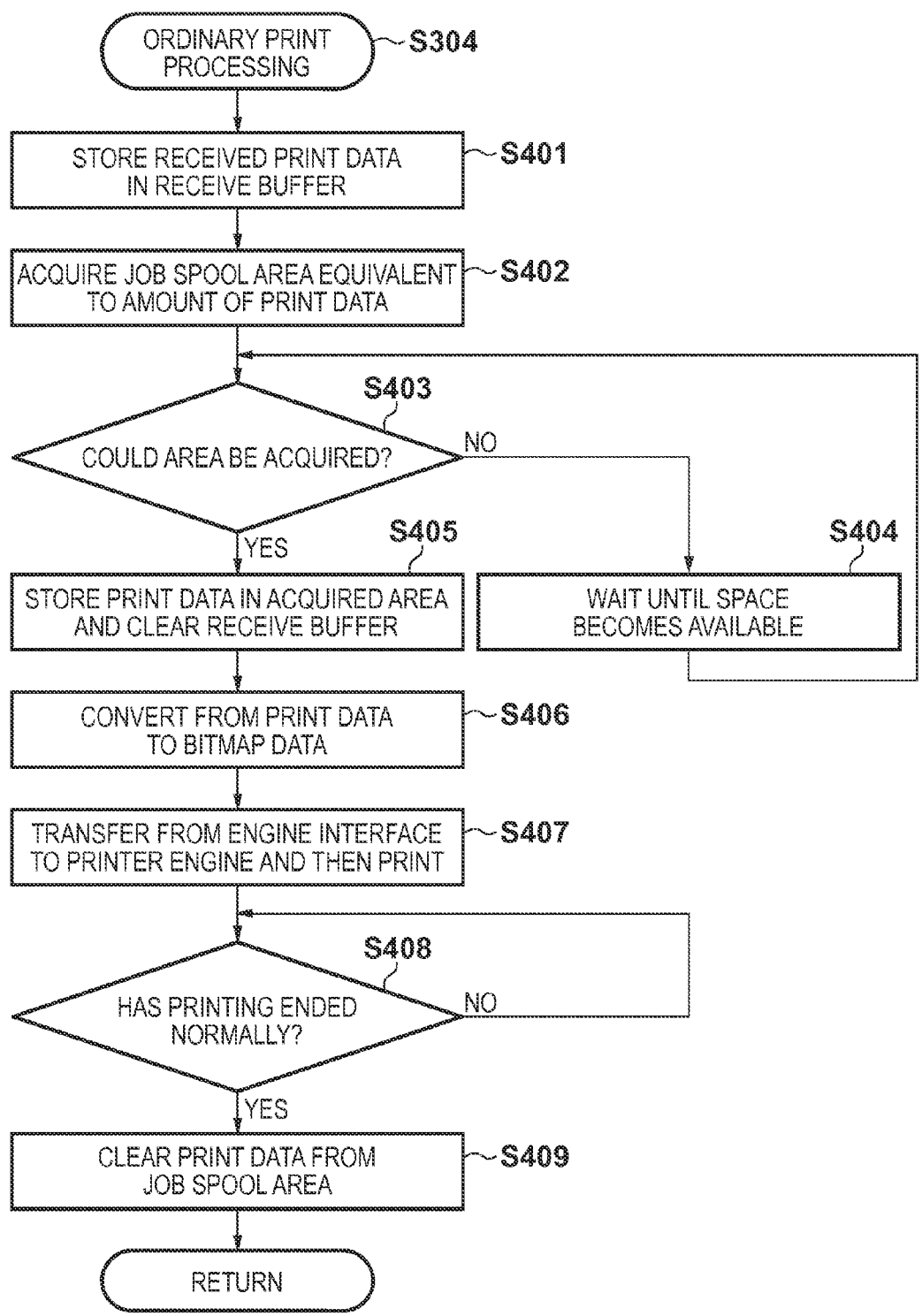
FIG. 4 is a flowchart for describing ordinary print processing in step S304 in FIG. 3.

FIG. 4 is a flowchart for describing ordinary print processing in step S304 in FIG. 3.

In step S401, the CPU 201 stores print data, which is included in a print job received from the personal computer 101, in a receive buffer that has been reserved in a portion of the RAM 202. Next, in step S402, when all of the print data is stored in the receive buffer, the CPU 201 acquires a job spool area, which has a capacity the same as the amount of received data, in a portion of the RAM 202 or hard-disk drive 204. Next, in step S403, the CPU 201 determines whether the job spool area could be acquired. If the job spool area could not be acquired (that is, if there is no free storage space available), then control proceeds to step S404 and the CPU 201 waits until the necessary free storage space becomes available in the RAM 202 or hard-disk drive 204.

If it is determined in step S403 that the job spool area could be acquired, then control proceeds to step S405 and the CPU 201 transfers the received print data from the receive buffer to the acquired job spool area and erases print data, which has been stored in the receive buffer, to prepare for receipt of the next item of print data. Next, in step S406, the CPU 201 converts the format of the print data to a data format in which the data will be transferred to the engine interface 206. (In the first embodiment, the conversion is to bitmap data.) The bitmap data obtained by the conversion is stored on the hard-disk drive 204 (or RAM 202) again. Next, in step S407, the CPU 201 transfers the bitmap data obtained by the conversion to the printer engine 104 via the engine interface 206 while synchronizing with the printer engine 104. Upon receiving the bitmap data, the printer engine 104 performs printing in accordance with the transferred bitmap data. In step S408, the CPU 201 determines whether printing has ended normally. If printing ends normally, control proceeds to step S409 and the CPU 201 deletes the print data that was stored in the job spool area in step S405.

Figure 5:
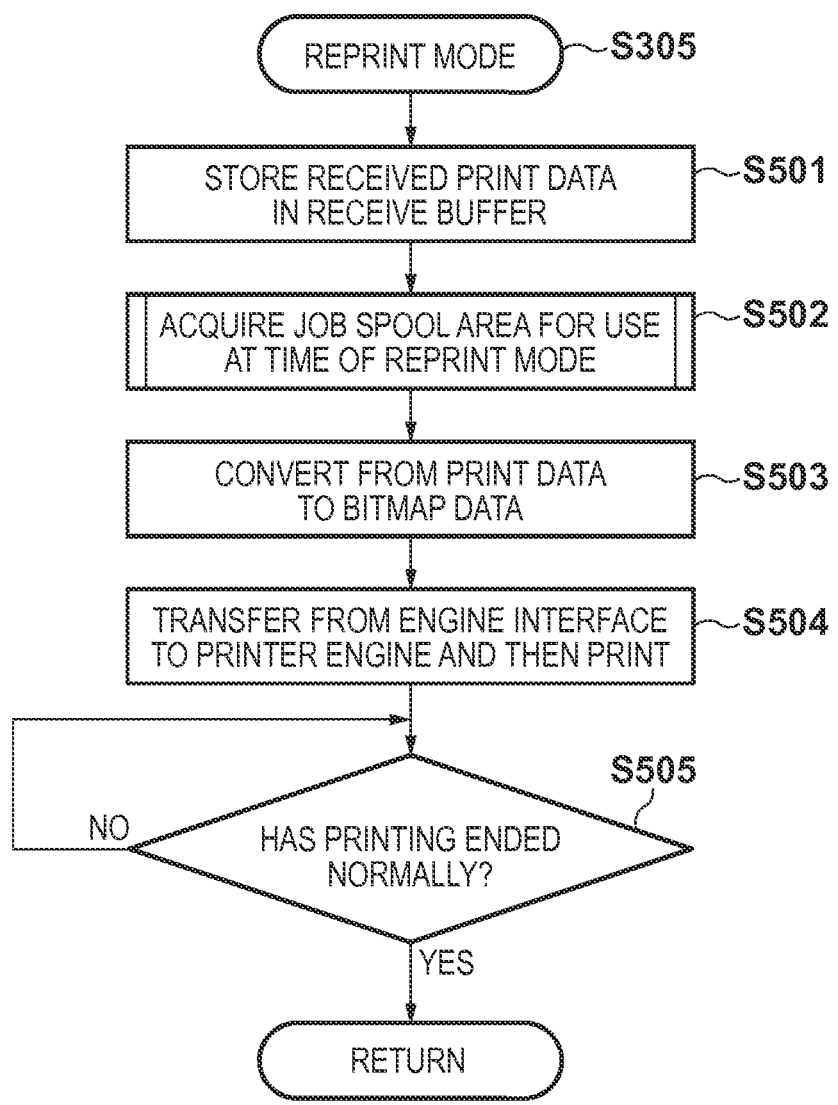
FIG. 5 is a flowchart for describing processing in case of a reprint mode in an ordinary print job in step S305 in FIG. 3.

FIG. 5 is a flowchart for describing processing in case of the reprint mode in an ordinary print job in step S305 in FIG. 3.

In step S501, the CPU 201 stores received print data in the receive buffer area, which has been acquired in the RAM 202 or the like, in a manner similar to that of ordinary print processing described in conjunction with FIG. 4. Next, since it is necessary to store the print data for reprinting, the CPU 201 acquires a job spool area, which is for use at the time of the reprint mode, in step S502. In the case of the reprint mode, received print data is held in the job spool area, even after it has been printed, and is then reprinted in accordance with an instruction from the user. Accordingly, it is required that print data that has been stored in the job spool area be managed by the job storage control unit 205. In the first embodiment, a stored-job management table 1001 (see FIG. 10) is created and stored in the RAM 202 or on the hard-disk drive 204, and the print data and attribute information thereof are managed. It should be noted that since the processing in steps S503 to S505 is similar to the processing in steps S406 to S408 in FIG. 4, this processing is not described again. It should be noted that the processing in FIG. 5 differs from the ordinary print processing described in FIG. 4 in that the print data that has been stored in the job spool area is not deleted even after printing ends. The reason is that the print data is utilized again when reprint is performed.

Thus, in accordance with the processing shown in FIG. 5, print data which has been set for reprinting and which is ordinary print data for which secure print has not been designated is saved in the job spool area even after this print data has been printed.

Figure 8:
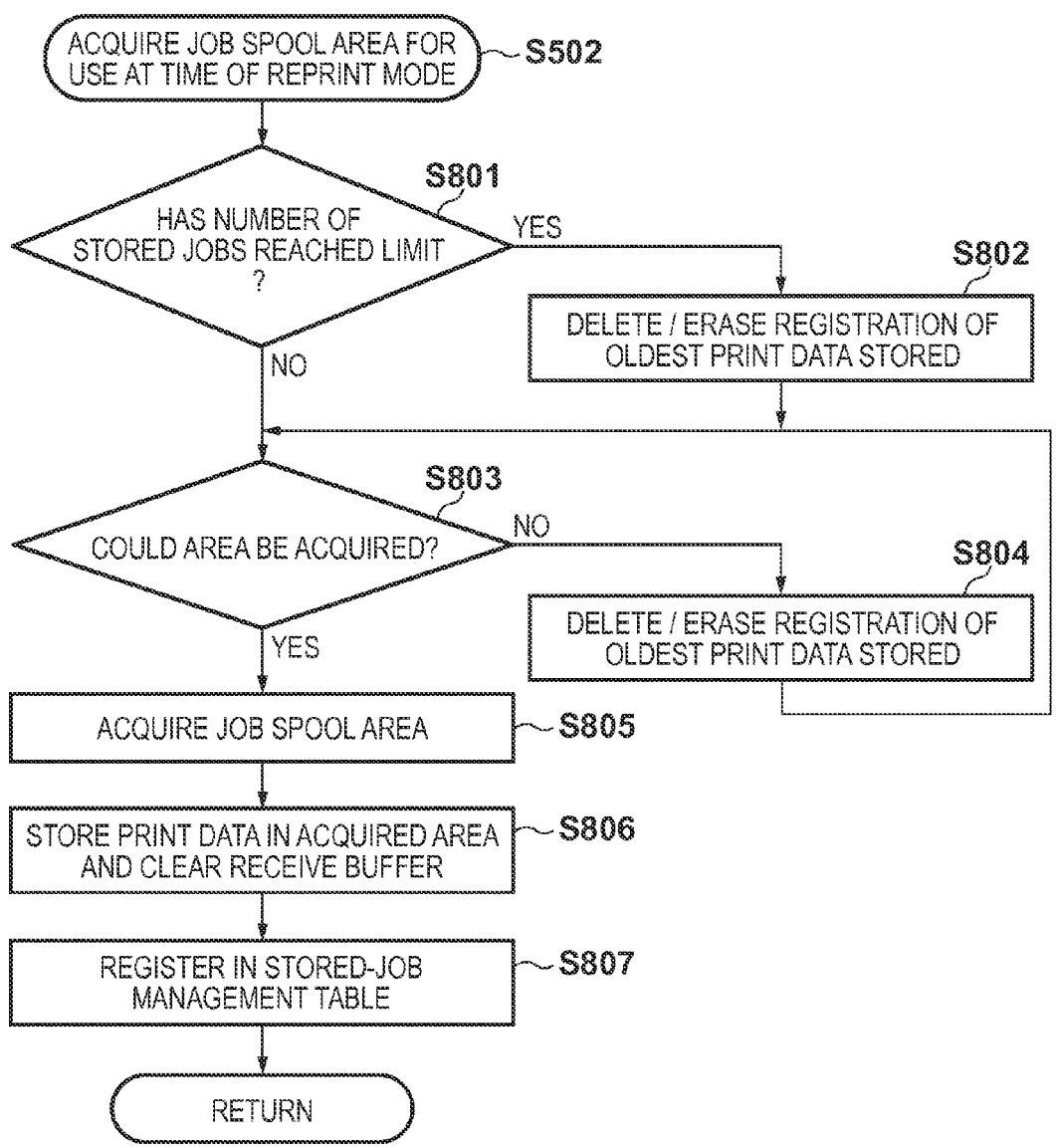
FIG. 8 is a flowchart for describing processing for acquiring a job spool area in a reprint mode in step S502 in FIG. 5.

FIG. 8 is a flowchart for describing processing for acquiring the job spool area in the reprint mode in step S502 in FIG. 5.

First, in step S801, the CPU 201 determines whether the number of jobs currently stored for reprinting has reached a predetermined limit (a prescribed condition). The print data just now received is included in the number of jobs. When the CPU 201 determines in step S801 that the limit on the number jobs has been reached, control proceeds to step S802. Here the CPU 201 refers to the stored-job management table 1001 to specify the oldest print data among the print data that has already been stored. The CPU 201 deletes this specified print data, erases its registration from the stored-job management table 1001 and executes step S803. If it is determined in step S801 that the limit on number of jobs has not been reached, control proceeds to step S803. Here the CPU 201 determines whether enough free memory capacity for storing the print data just received can be acquired in the storage area of, for example, hard-disk drive 204. If it is determined in step S803 that there is not enough space available in the storage area, control proceeds to step S804. Here, in a manner similar to that in step S802, the CPU 201 deletes the oldest data among the stored print data from this storage area and erases the registration of this print job from the stored-job management table 1001. It is required that the processing in step S804 be executed repeatedly until enough storage space can be freed up in the storage area in step S803.

When it is determined in step S803 that the storage area has enough space for a job spool area, control proceeds to step S805. Here the CPU 201 acquires a job spool area, the capacity of which is the same as the amount of print data just received, in the hard-disk drive 204, by way of example. Next, in step S806, the CPU 201 transfers the print data that has been stored in the receive buffer to the job spool area acquired in step S805 and deletes print data that has already been stored in the receive buffer. Next, in step S807, the CPU 201 registers in the stored-job management table 1001 the attribute information of the print job just stored.

As a result, if the reprint mode has been designated, received print data is stored in the job spool area. When a reprint instruction is input from the operation panel 103, therefore, the print data can be reprinted even though the print data is not received from the personal computer 101 again.

Figure 6:
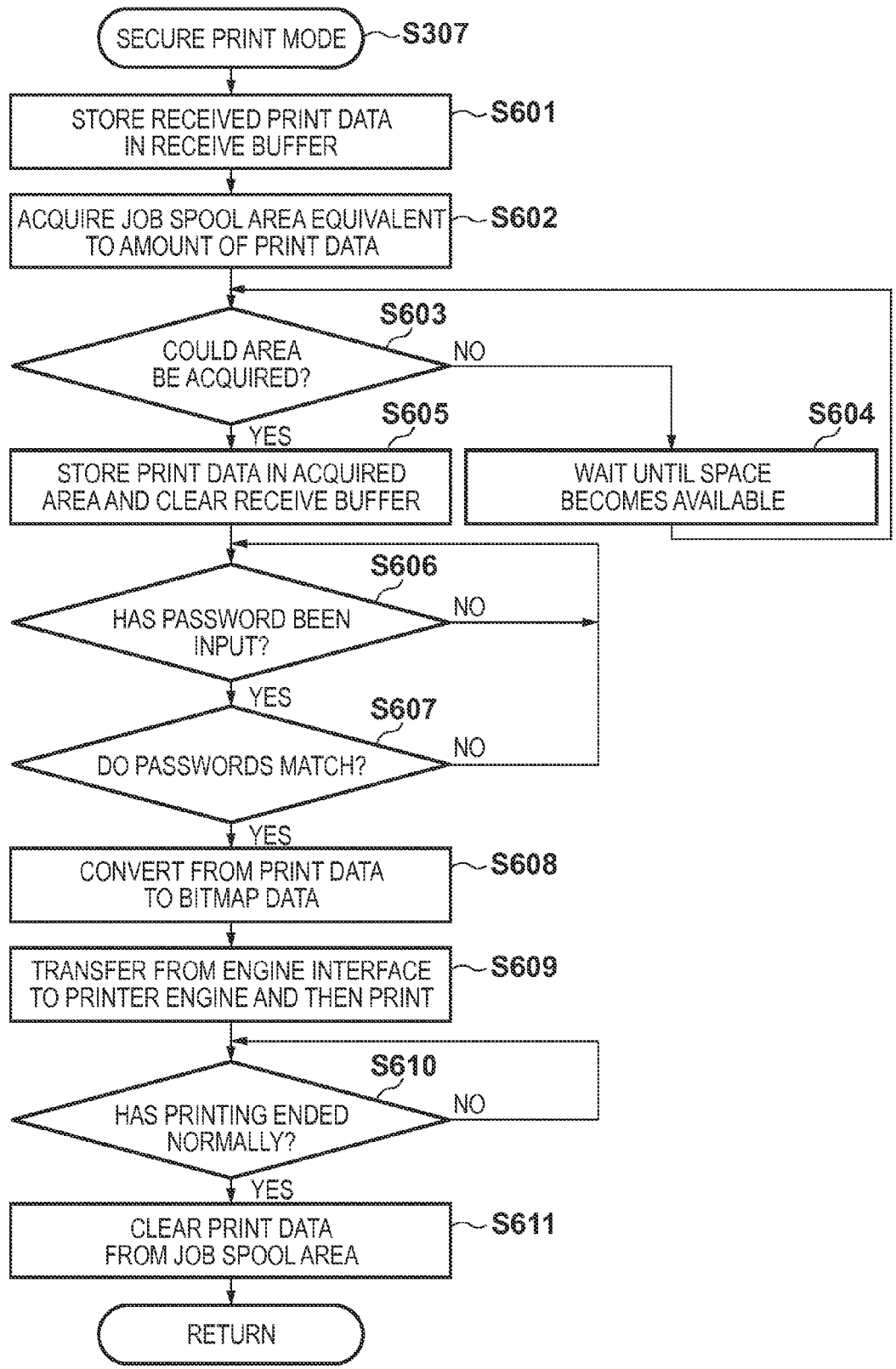
FIG. 6 is a flowchart for describing print processing in a secure print mode in step S307 in FIG. 3.

FIG. 6 is a flowchart for describing print processing in the secure print mode in step S307 in FIG. 3. It should be noted that since the processing in steps S601 to S605 in FIG. 6 is the same as the processing at steps S401 to S405 described in connection with the ordinary print processing of FIG. 4, this processing is not described again.

After the CPU 201 stores the print data in the job spool area in step S605, control proceeds to step S606 and the CPU 201 determines, before processing proceeds to print processing, whether a password has been input from the operation panel 103. When print is instructed from the personal computer 101 in the secure print mode, a password is appended to the instruction beforehand by the printer driver (this is not shown in the flowchart), as mentioned above. The appended password is transmitted along with the print job to the image forming apparatus 100 and the print job is executed only if the password matches a password that the user of the image forming apparatus 100 has input from the operation panel 103. Accordingly, when the password is entered in step S606, control proceeds to step S607, where the CPU 201 determines whether this entered password matches the password that has been set for the print job. If the password does not match, control returns to step S606 and the system waits for the user to re-enter the password. The CPU 201 executes print control processing in steps S608 to S610 only if the password matches. It should be noted that since the processing at steps S608 to S611 is the same as the processing at steps S406 to S409 of FIG. 4, this processing is not described again. Since the reprint mode has not been set here, the print data that has been stored in the job spool area is deleted in step S611 when print processing ends.

Figure 7:
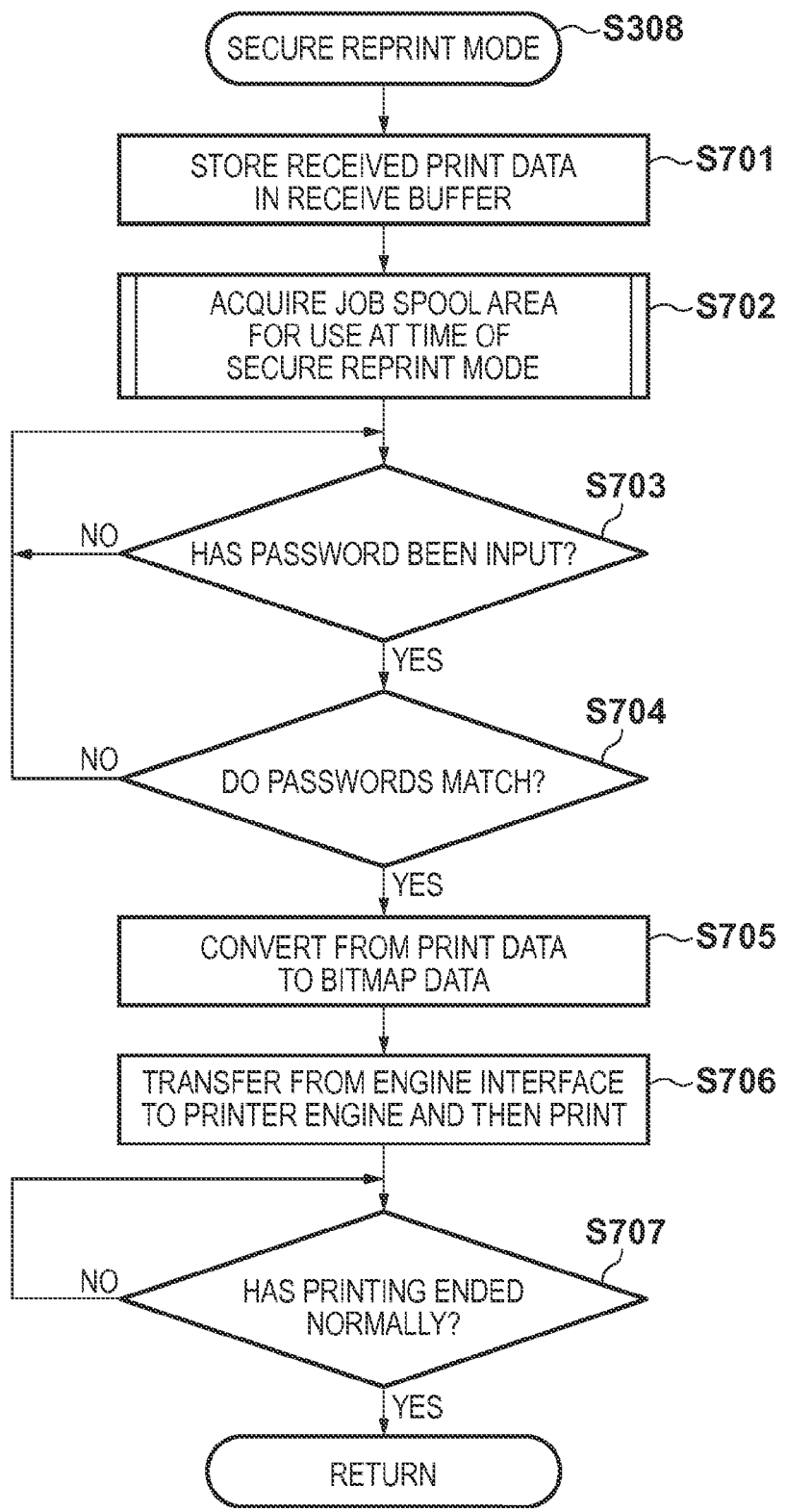
FIG. 7 is a flowchart for describing print processing in a secure reprint mode in step S308 in FIG. 3.

FIG. 7 is a flowchart for describing print processing in the secure reprint mode in step S308 in FIG. 3.

First, in step S701, the CPU 201 stores received print data in the receive buffer in a manner similar to that in step S501 in FIG. 5. Next, in step S702, the CPU 201 executes, as processing specialized for secure reprint, processing for acquiring a job spool area for when reprinting is performed. This processing will be described in detail with reference to the flowchart of FIG. 9.

Figure 9:
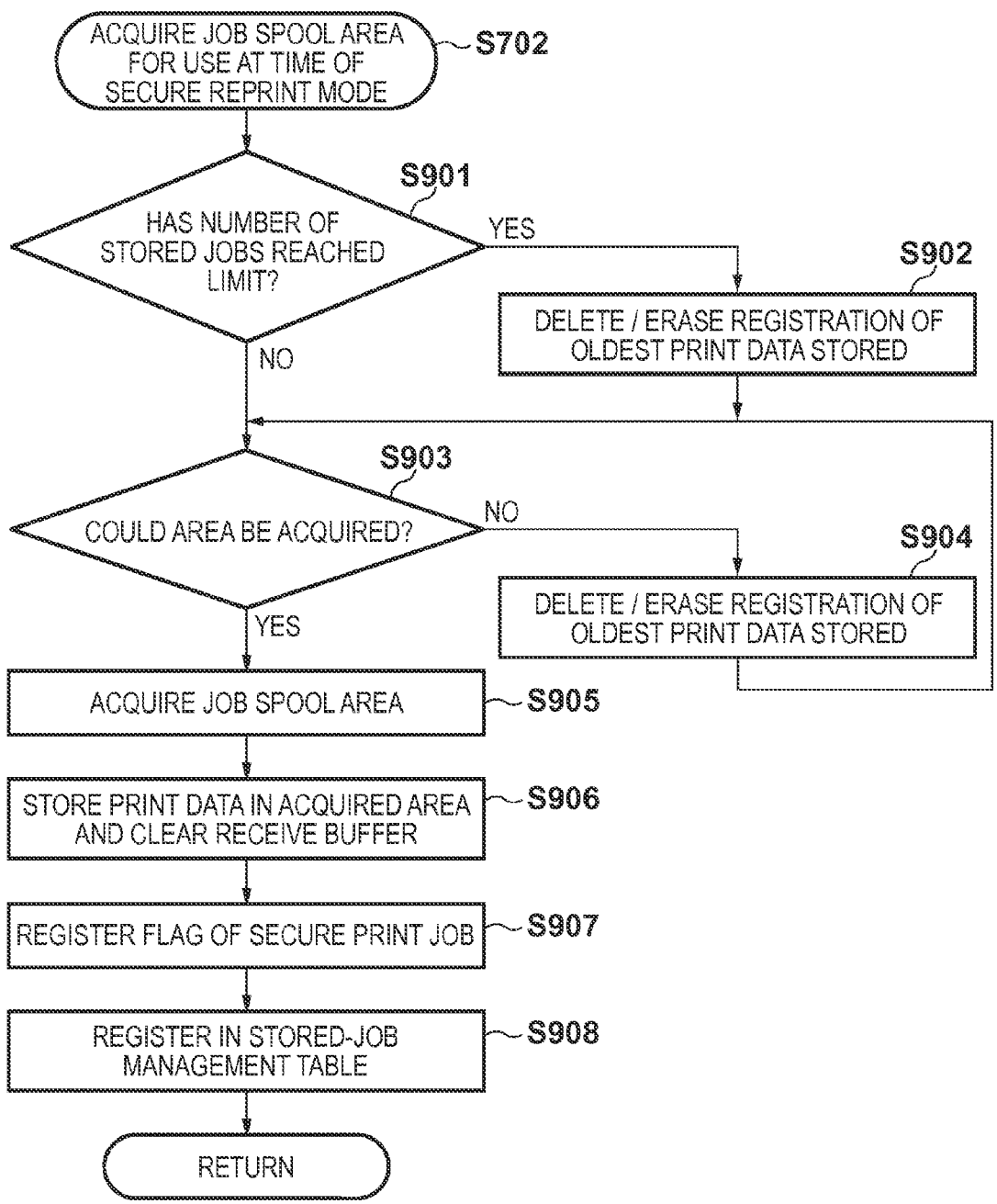
FIG. 9 is a flowchart for describing processing for acquiring a job spool area in a secure reprint mode in step S702 in FIG. 7.

FIG. 9 is a flowchart for describing processing for acquiring a job spool area in the secure reprint mode in step S702 in FIG. 7. As described above in conjunction with steps S801 to S804 of FIG. 8, the processing of steps S901 to S904 in FIG. 9 involves determining conditions regarding the limit on number of stored jobs and the limit on the storage area and executing processing for deleting print data if necessary. If it is determined in step S903 that there is enough free storage space for the job spool area, then control proceeds to step S905. Here the CPU 201 acquires a job spool area, the capacity of which is the same as the amount of print data received, in the hard-disk drive 204, by way of example. Next, in step S906, the CPU 201 transfers the print data that has been stored in the receive buffer to the job spool area and clears the receive buffer. Next, the CPU 201 executes processing specific to a secure print job. That is, in step S907, the CPU 201 raises a flag, which indicates the fact that the job is a secure print job, when the job is to be registered in the stored-job management table 1001. Then, in step S908, the CPU 201 registers the job in the stored-job management table 1001. As a result, whether a job is a secure print job can be discriminated when reference is had to the stored-job management table 1001.

Control the returns to print processing in the secure print mode in FIG. 7. Since the processing in steps S703 to S707 is the same as the processing in steps S606 to S610 of FIG. 6, this processing is not described again. It should be noted that since print data stored for the purpose of reprinting continues to be retained in memory, the print data that has been stored in the job spool area in FIG. 7 is not deleted, as it is in step S611 in FIG. 6, after it has been determined that printing has ended normally.

By virtue of this processing, print data of a print job for which reprint has been instructed in the secure print mode is stored in the storage area together with the password for this print job.

FIG. 10 is a diagram for describing the stored-job management table 1001, namely the table for managing print data for reprint according to the first embodiment. This table is for managing a plurality of print jobs that have been stored as job spool areas in a storage area, e.g., the hard-disk drive 204.

Job IDs, names of the owners of the jobs, job names (document file names), data sizes, print-job registration dates and status of a secure print flag 1002 have been registered in the stored-job management table 1001. Further, although not shown in FIG. 10, the storage destination (RAM 202, hard-disk drive 204, etc.) of print data and a link destination (address, etc.) may also be registered. It should be noted that the processing in step S907 in FIG. 9 is reflected in the secure print flag 1002 of the stored-job management table 1001.

In the example of FIG. 10, a print job for which the job ID is "id0003" and whose file name is "Financial_data" has been registered as a secure reprint job.

FIGS. 11A to 11E are diagrams for describing examples of displays presented on the operation panel 103 in a case where a user executes reprinting.

Figure 11A:
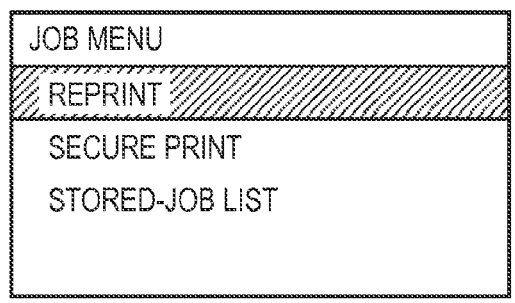
FIGS. 11A to 11E are diagrams for describing examples of displays presented on an operation panel in a case where a user executes reprinting.

FIG. 11A depicts a view illustrating an example of a reprint menu screen. The user operates the operation panel 103 on the image forming apparatus 100 and specifies printing from this reprint menu item. FIG. 11A illustrates that "REPRINT" has been selected.

Figure 11B:
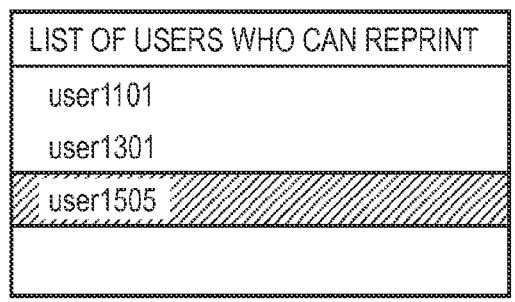

FIG. 11B depicts a view illustrating an example of display of a list of users (users who are owners) who have accessed the reprint menu and registered print jobs capable of being reprinted. A user selects his or her own user name from the list. In FIG. 11B, the user name "user1505" has been selected.

Figure 11C:
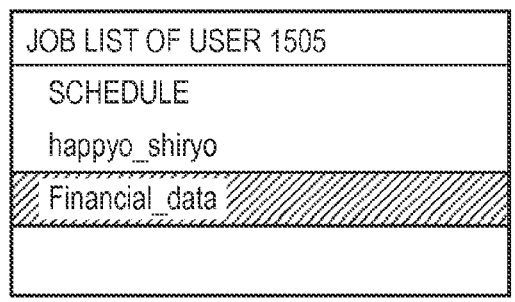

FIG. 11C depicts a view illustrating an example of display of a list of reprintable print jobs that have been registered by a selected owner user. Here three documents "SCHEDULE", "happyo_shiryo" and "Financial_data" are being displayed as documents capable of being reprinted by "user1505". The user selects the document he or she wishes to reprint. In FIG. 11C, "Financial_data" has been selected.

Figure 11D:
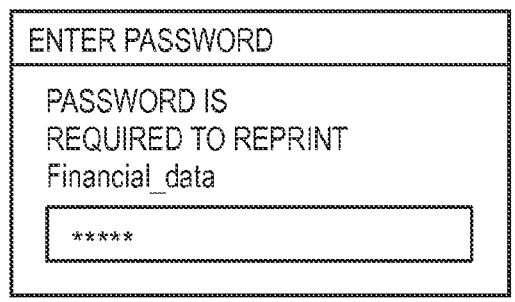
Figure 11E:
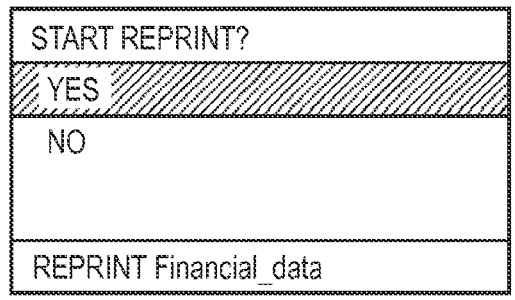

FIG. 11D depicts a view illustrating a display screen which, in a case where the document "Financial_data" selected in FIG. 11C has been designated as a document for secure print, seeks input of the password that has been set for secure print. The user enters the password in accordance with this instruction on the display screen. If the entered password and the registered password match, a screen as shown in FIG. 11E asking whether reprint is to start is displayed. Further, if the entered password does not match the registered password in FIG. 11D, a warning screen (not shown) indicating that the passwords do not match is displayed.

In a case where the document selected in FIG. 11C is not a secure print job, the screen shown in FIG. 11E asking whether reprint is to start is displayed without the screen of FIG. 11D being displayed first. If the user selects "YES" in FIG. 11E, the selected document is reprinted.

In the first embodiment, in addition to a case where the number of registered jobs has reached the limit or where there is no longer space available in the storage area, there is a further condition according to which print data that has been stored for reprinting in, for example, the hard-disk drive 204 is deleted. The timing for deletion of print data that has been stored for reprinting will be described in detail later. It should be noted that it may be arranged so that print data for reprinting may be stored on the portable medium 211 of FIG. 2, such as an SD card, and not just on the hard-disk drive 204.

Thus, as set forth above, print data that has been stored in the image forming apparatus 100 for reprinting can be printed by anyone as long as the printing mode is not the secure reprint mode. This is to avoid printing when security is a consideration. Accordingly, in the first embodiment, print data for reprinting is deleted automatically when a prescribed period of time elapses following registration of this print data in the stored-job management table 1001. In addition, the registration data is erased from the stored-job management table 1001. Furthermore, the prescribed period of time is changed in accordance with whether a print job is one that has been registered as a job for the secure reprint mode. Specifically, a first prescribed time period that extends up to the moment of deletion of a print job that has been registered in the secure reprint mode is made longer than a second prescribed time period that extends up to the moment of deletion of a print job that is not to undergo secure reprint.

By adopting such an arrangement, even a print job that is not to undergo secure reprint can be stored for reprinting, and the length of time during which there is the possibility that a print job that is not to undergo secure reprint will be printed by another individual can be shortened.

Figure 12:
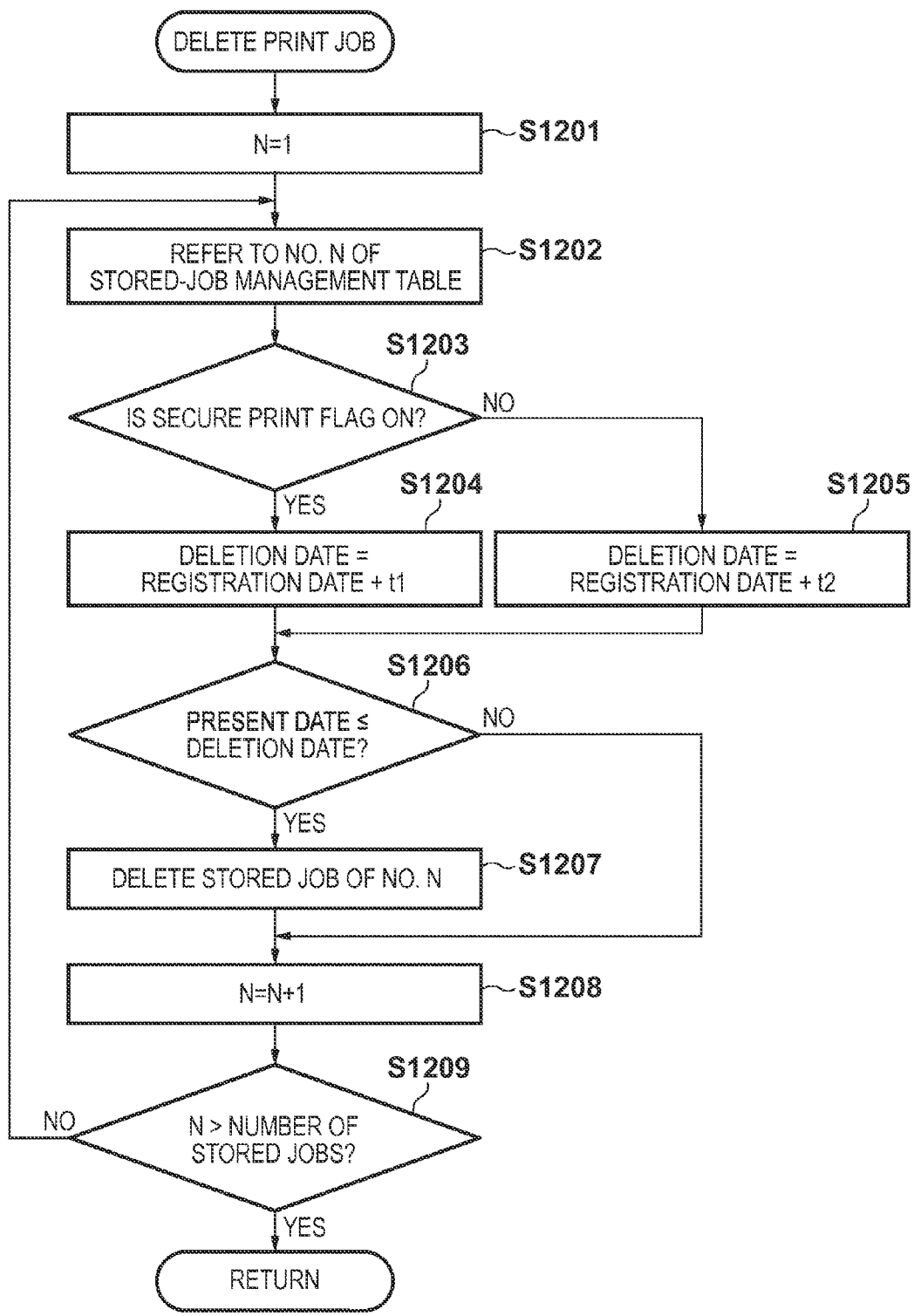
FIG. 12 is a flowchart for describing processing for deleting a print job that has been stored for reprinting in an image processing apparatus according to a first embodiment.

FIG. 12 is a flowchart for describing processing for deleting a print job that has been stored for reprinting in the image processing apparatus 100 according to the first embodiment. This processing is executed by the job storage control unit 205 and CPU 201 incorporated in the image forming apparatus 100.

First, in step S1201, the CPU 201 sets the initial value of a variable N to "1". The variable N has been set in the RAM 202. Next, control proceeds to step S1202, where the CPU 201 refers to print jobs, which are currently registered in the stored-job management table 1001, starting from No. N (N=1). Next, in step S1203, based upon the information that has been registered in the stored-job management table 1001, CPU 201 determines whether this print job is a secure print job. The determination as to whether the print job is a secure print job can be made by checking the status of the secure print flag 1002 that has been registered in the stored-job management table 1001. If the CPU 201 determines in step S1203 that the print job is a secure print job, control proceeds to step S1204 and the CPU 201 sets the deletion date to (registration date+t1). On the other hand, if the CPU 201 determines in step S1203 that the print job is not a secure print job, then control proceeds to step S1205 and the CPU 201 sets the deletion date to (registration date+t2). When the deletion date is thus set in step S1204 or S1205, control proceeds to step S1206, where the CPU 201 compares the present date and the set date. When the present date reaches the deletion date, control proceeds to step S1207, where the CPU 201 deletes this print job. Then, in step S1208, the CPU 201 increments the variable N, determines in step S1209 whether the value of N has exceeded the stored number of jobs and returns processing to step S1202 if the number of stored jobs has not been reached.

If the processing of steps S1202 to S1207 is thus completed with regard to all of the print jobs that have been registered in the stored-job management table 1001, then this subroutine is exited.

The effects of setting t1 and t2 to times that differ from each other will now be described. Assume for example that t1 and t2 are five days and one day, respectively. As a result of such a setting, a secure print job is not deleted automatically for five days following its registration, but if a print job is not a secure print job, then it is deleted automatically one day after it is registered. The reason for this is that since a password is necessary in order for a secure print job to be reprinted, it is judged that the degree of security will still be high even though the secure print job is stored for a prolonged period of time. Accordingly, a secure print job is retained in the image forming apparatus 100 for a longer period of time, thereby assuring user convenience for a user who wishes to utilize reprinting.

On the other hand, since a print job that is not a secure print job can be reprinted by any user, this print job is not retained in the image forming apparatus 100 for a long period of time and is deleted automatically after a short period of time, thereby enhancing security rather than convenience.

Conversely, since the degree of confidentiality is considered to be high for a print job that is the object of secure print, storing this print data for a long period of time in the image forming apparatus 100, which can be accessed by an unspecified number of users, is undesirable. In view of this consideration, it is also possible to adopt a setting in which t1 and t2 are set, for example, to five hours and one day, respectively, a print job to undergo secure print is deleted promptly and the time over which this print job can be reprinted is shortened. In the first embodiment, since the length of time up to the moment of automatic deletion can be varied in dependence upon whether a print job is a secure print job, either the arrangement in which t1>t2 holds or the arrangement in which t1<t2 holds can be adopted.

[Second Embodiment]

A second embodiment according to the present invention will be described next. The second embodiment is implementable using the hardware configuration of the image forming apparatus 100 described in the first embodiment.

In the second embodiment, an arrangement in which a reprint password is capable of being set by the printer driver of the personal computer 101, which transmits a print job, will be described.

Figure 13:
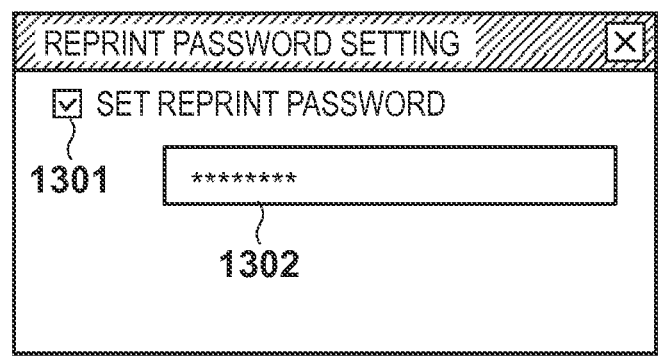
FIG. 13 is a diagram illustrating an example of a reprint-password setting screen of a printer driver that runs on a personal computer according to a second embodiment.

FIG. 13 is a diagram illustrating an example of a reprint-password setting screen of a printer driver operated by the personal computer 101 according to the second embodiment.

If a check is placed in a check box 1301 as shown in FIG. 13, a password input area 1302 is activated and it becomes possible to set a password for executing reprint.

The function of this password for reprint differs from that for secure print described in the first embodiment. Even when this reprint password has been set, if the print job is executed from the personal computer 101, then this print job is printed without input of the password in a manner similar to that of the ordinary reprint print job.

However, if the user specifies reprint using the operation panel 103 on the image forming apparatus 100, then the image forming apparatus 100 requests input of the password (reprint password) that corresponds to the specified print job (document). If the designated password is entered on the screen of FIG. 13, then reprint processing based upon this print job is executed. It should be noted that if a check is not placed in the check box 1301 on the screen of the printer driver, then operation will be similar to that of the reprint mode described in the first embodiment.

FIG. 15 is a diagram illustrating an example of the stored-job management table according to the second embodiment.

FIG. 15 depicts a view illustrating an example of a stored-job management table 1501, which is managed by the job storage control unit 205, in a case where the image forming apparatus 100 that is capable of setting a reprint password and the printer driver of the personal computer 101 are used. As shown in FIG. 15, the stored-job management table 1501 is obtained by adding a flag 1502, which indicates whether or not there is a reprint password, to the stored-job management table 1001 described in FIG. 10. In a case where attribute information of a print job received from the personal computer 101 includes a reprint password, the reprint password flag 1502 of stored-job management table 1501 is set to "1".

Figure 14:
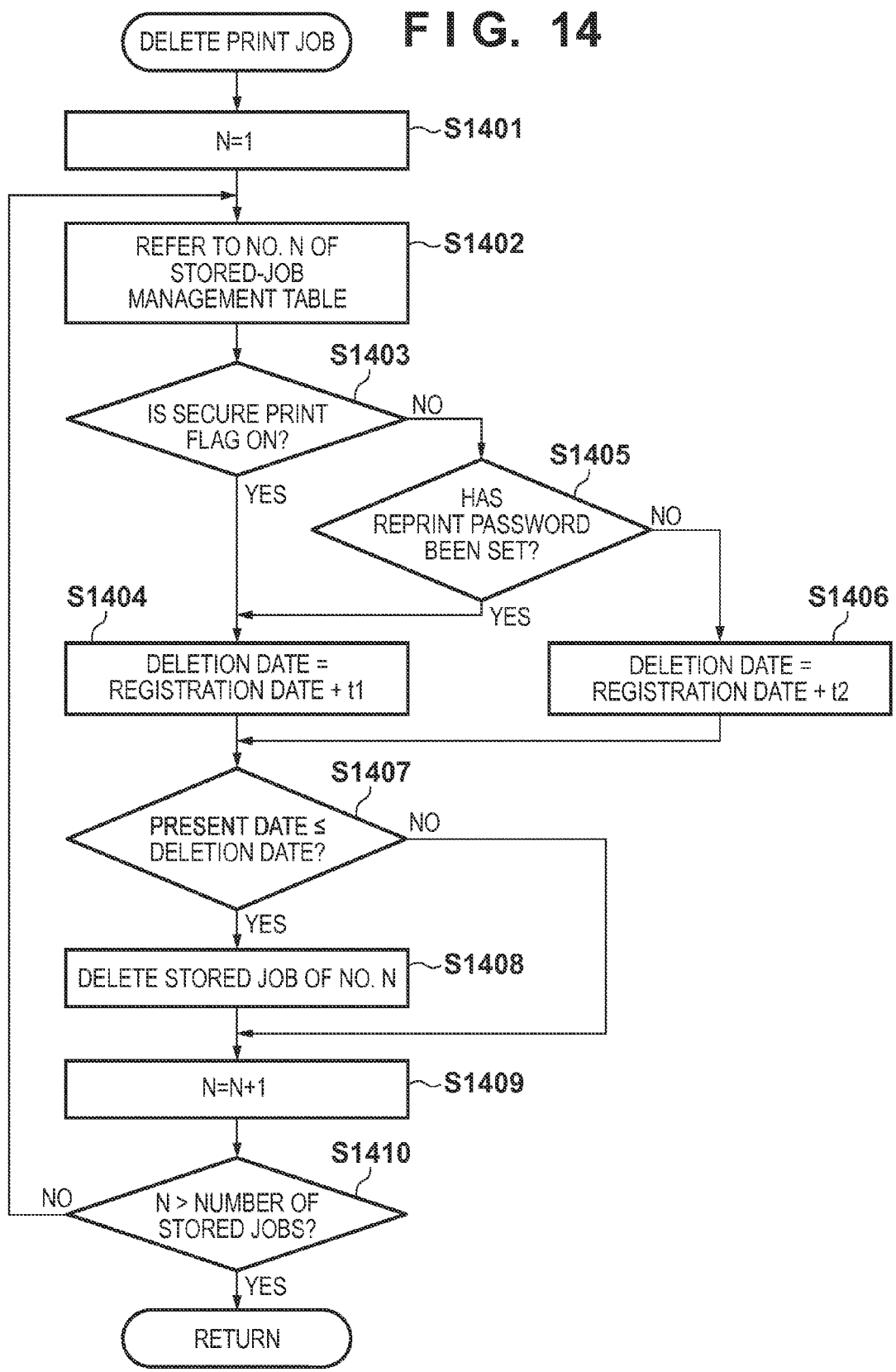
FIG. 14 is a flowchart for describing print-job deletion processing, which is executed in the image processing apparatus of the second embodiment, corresponding to a case where a print job is transmitted from a printer driver that is capable of setting a reprint password.

FIG. 14 is a flowchart for describing print-job deletion processing, which is executed in the image processing apparatus 100 of the second embodiment, corresponding to a case where a print job is transmitted from a printer driver that is capable of setting a reprint password. The processing in the flowchart of FIG. 14 is executed by having the CPU 201 perform control and processing in accordance with a control program that has been stored in the ROM 203 or on the hard-disk drive 204. The flowchart of FIG. 14 is obtained by adding a determination step S1405 to the flowchart described in FIG. 12 of the first embodiment. Since processing in steps S1401 to S1403 of FIG. 14 is the same as the processing in steps S1201 to S1203 of FIG. 12, this processing is not described again.

If the CPU 201 determines in step S1403 that the print job is not a secure print job, control proceeds to step S1405. In step S1405, the CPU 201 checks the status of the reprint password flag 1502 described in FIG. 15, thereby determining whether a reprint password has been set as attribute information of the print job. That is, when it is found in step S1405 that a reprint password has been set, control proceeds to step S1404. Here the CPU 201 sets the deletion date to (registration date+t1). Otherwise, control proceeds to step S1406 and the CPU 201 sets the deletion date to (registration date+t2). It should be noted that since the processing in steps S1401 to S1404 and steps S1406 to S1410 of FIG. 14 is the same as the processing at steps S1201 to S1204 and steps S1205 to S1209 of FIG. 12, this processing is not described again. It should be noted that t1 and t2 are defined in a manner similar to that of the first embodiment.

By virtue of this processing, if a reprint password has been set, a setting can be made so as to result in deletion processing similar to that executed for a secure print job. As a result, it is possible to achieve both security for reprint print jobs and convenience for users who wish to utilize reprinting.

In the first and second embodiments described above, it is arranged so that print data that has been stored for reprinting is deleted at the time of secure print or in a case where a password for reprint has been set. However, it may be arranged so that if there is extra memory capacity for storing a job spool area, a reprint job for which security is maintained by a password is not deleted. The reason for this is that it is considered that a print job protected by a password is in no danger of being reprinted by another individual without the permission of the owner of the print job.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-205233, filed Sep. 20, 2011, which is hereby incorporated by reference herein in its entirety.

What is claimed is:

1. A printing apparatus for executing print processing based upon print data, comprising:
   a storage unit configured to store print data, which is to be reprinted, received from a host computer;
   a determination unit configured to determine whether a password for secure print has been appended to the print data, which is to be reprinted, stored in the storage unit;
   a print control unit configured to print the print data in accordance with an input of the password for secure print from a user in a case where it is determined by the determination unit that the password for secure print has been appended to the print data;
   a deletion unit configured to delete the print data, which is to be reprinted, stored in the storage unit, upon elapse of a prescribed period of time following storage of the print data, which is to be reprinted, in the storage unit; and
   a control unit configured to exercise control so as to set, to periods of time that differ from each other, the prescribed period of time regarding the print data determined by the determination unit to have the password for secure print appended thereto and the prescribed period of time regarding the print data determined by the determination unit to not have the password for secure print appended thereto.

2. The apparatus according to claim 1, wherein the control unit makes the prescribed period of time regarding the print data determined by the determination unit to have the password for secure print appended thereto longer than the prescribed period of time regarding the print data determined by the determination unit to not have the password for secure print appended thereto.

3. The apparatus according to claim 1, wherein the control unit makes the prescribed period of time regarding the print data determined by the determination unit to have the password for secure print appended thereto shorter than the prescribed period of time regarding the print data determined by the determination unit to not have the password for secure print appended thereto.

4. A printing apparatus for executing print processing based upon print data, comprising:
   a storage unit configured to store print data, which is to be reprinted, received from a host computer;
   a determination unit configured to determine whether the print data, which is to be reprinted, stored in the storage unit is print data of a print job that requests a password when the print data is to be reprinted;
   a deletion unit configured to delete the print data, which is to be reprinted, stored in the storage unit, upon elapse of a prescribed period of time following storage of the print data, which is to be reprinted, in the storage unit; and
   a control unit configured to exercise control so as to set, to periods of time that differ from each other, the prescribed period of time regarding the print data determined by the determination unit to be print data of a print job that requests a password when the print data is to be reprinted and the prescribed period of time regarding the print data determined by the determination unit not to be print data of a print job that requests a password when the print data is to be reprinted.

5. The apparatus according to claim 4, wherein the control unit makes the prescribed period of time regarding the print data determined by the determination unit to be print data of a print job that requests a password when the print data is to be reprinted longer than the prescribed period of time regarding the print data determined by the determination unit not to be print data of a print job that requests a password when the print data is to be reprinted.

6. A control method of controlling a printing apparatus for executing print processing based upon print data, comprising:
   a storage step of storing in a memory print data, which is to be reprinted, received from a host computer;
   a determination step of determining whether a password for secure print has been appended to the print data, which is to be reprinted, stored in the memory;
   a print control step of printing the print data in accordance with input of the password for secure print from a user in a case where it is determined in the determination step that the password for secure print has been appended to the print data;

a deletion step of deleting the print data, which is to be reprinted, stored in the memory in the storage step, upon elapse of a prescribed period of time following storage of the print data, which is to be reprinted, in the memory; and a control step of exercising control so as to set, to periods of time that differ from each other, the prescribed period of time regarding the print data determined in the determination step to have the password for secure print appended thereto and the prescribed period of time regarding the print data determined in the determination step to not have the password for secure print appended thereto.

7. A control method of controlling a printing apparatus for executing print processing based upon print data, comprising:

a storage step of storing in a memory print data, which is to be reprinted, received from a host computer;

a determination step of determining whether the print data, which is to be reprinted, stored in the memory is print data of a print job that requests a password when the print data is to be reprinted;

a deletion step of deleting the print data, which is to be reprinted, stored in the memory, upon elapse of a prescribed period of time following storage of the print data, which is to be reprinted, in the memory; and a control step of exercising control so as to set, to periods of time that differ from each other, the prescribed period of time regarding the print data determined in the determination step to be print data of a print job that requests a password when the print data is to be reprinted and the prescribed period of time regarding the print data determined in the determination step not to be print data of a print job that requests a password when the print data is to be reprinted.

* * * * *